(12) United States Patent
Bahr et al.

(10) Patent No.: US 7,991,489 B2
(45) Date of Patent: Aug. 2, 2011

(54) ESTIMATE PROCESS CAPABILITY DATABASE POPULATOR

(75) Inventors: Brian J. Bahr, St. Charles, MO (US);
Jason M. Keller, Maryland Heights, MO (US); Dale R. Mansholt, Bunker Hill, IL (US)

(73) Assignee: The Boeing Company, Chicago, IL (US)

( * ) Notice: Subject to any disclaimer, the term of this patent is extended or adjusted under 35 U.S.C. 154(b) by 250 days.

(21) Appl. No.: 11/296,750

(22) Filed: Dec. 7, 2005

(65) Prior Publication Data

US 2007/0129823 A1 Jun. 7, 2007

(51) Int. Cl.
*G05B 13/12* (2006.01)
*G06F 17/00* (2006.01)
(52) U.S. Cl. ............................................. 700/36; 706/45
(58) Field of Classification Search ................... 700/36; 706/45; 707/102
See application file for complete search history.

(56) References Cited

U.S. PATENT DOCUMENTS

| | | | |
|---|---|---|---|
| 5,301,118 A * | 4/1994 | Heck et al. | 700/109 |
| 5,956,251 A * | 9/1999 | Atkinson et al. | 700/109 |
| 6,466,927 B1 * | 10/2002 | Dougherty et al. | 706/45 |
| 6,546,300 B1 * | 4/2003 | Fukuda et al. | 700/100 |
| 6,691,127 B1 * | 2/2004 | Bauer et al. | 707/102 |
| 6,922,600 B1 * | 7/2005 | Conrad et al. | 700/108 |
| 6,961,732 B2 * | 11/2005 | Hellemann et al. | 707/102 |
| 7,110,956 B1 * | 9/2006 | Drake et al. | 705/7 |
| 7,171,897 B2 * | 2/2007 | Barajas et al. | 101/129 |
| 2002/0016753 A1 * | 2/2002 | Torii | 705/35 |
| 2002/0026257 A1 * | 2/2002 | Newmark | 700/108 |
| 2002/0123943 A1 * | 9/2002 | Gupta et al. | 705/28 |
| 2003/0009397 A1 * | 1/2003 | Whitenack et al. | 705/28 |
| 2003/0093243 A1 * | 5/2003 | Kusch et al. | 702/182 |
| 2004/0030611 A1 * | 2/2004 | Byrne | 705/26 |
| 2004/0111410 A1 * | 6/2004 | Burgoon et al. | 707/4 |
| 2005/0060647 A1 * | 3/2005 | Doan et al. | 715/514 |
| 2005/0114098 A1 * | 5/2005 | Nagahara | 703/2 |
| 2007/0130316 A1 * | 6/2007 | Turakhia | 709/224 |
| 2009/0063209 A1 * | 3/2009 | Dubois et al. | 705/7 |

OTHER PUBLICATIONS

Hippel, P., Journal of Statistics Education, vol. 13, Nov. 2, 2005. www.amstat.org/publications/jse/v/13n2/vonhippel.html.*
Bower Kieth, 'Capability Analysis with Non-Normal Data' Mar. 2005, http://www.keithbower.com/pdflibrary/.*
Xberry 'Capability Studies' -http://www.xberry.fsnet.co.uk/Capstudy.htm (Jul. 13, 2001-Internet Archive).*
S.H. Steiner, "Understanding Process Capability Indices," B. Abraham and R.J. Mackay, IIQP Research Report, 1997.*
William A. Levinson, P.E., Random Number Generator, Version 1, May 1998.*
Robert Saltstone, A Computer Program to Construct Distributions with Specific Degrees of Skew and Kurtosis, Journal of Classification, 1992.*
R., Shonkwiler, Math 4255 Class Notes, 1997-2004.

* cited by examiner

*Primary Examiner* — Ramesh B Patel
*Assistant Examiner* — Darrin Dunn
(74) *Attorney, Agent, or Firm* — Armstrong Teasdale LLP (57) ABSTRACT

A method for creating a generated data set(s) for use in process capability calculations that mimics the statistics of a raw data set is presented. The method includes the steps of inputting desirable statistics and generating numbers from theoretical statistical distributions. This generated data can be combined with other generated data and used to calculate global process capabilities. In addition, the global process capabilities can be used to accept or reject supplier(s) from a list of suppliers. An apparatus for implementing the method outlined above comprising raw data statistics, number generating algorithm(s) and storage medium(s) is also presented.

18 Claims, 6 Drawing Sheets

ESTIMATE PROCESS CAPABILITY DATABASE POPULATOR

TECHNICAL FIELD

The present invention relates to data generation and process capability determinations. More precisely the present invention relates to a method for generating data from specific statistical information derived from raw data, determining a process capability factor from the data generated.

BACKGROUND OF THE INVENTION

Manufacturers and suppliers are continuously looking for ways to monitor and improve processes. Customers are continuously monitoring the quality of goods they receive. Capability Analysis is an excellent method for determining and tracking whether or not a process is yielding acceptable results. A Capability Analysis compares the distribution of output from an in-control process to its specification limits to determine the consistency with which the specification limits can be met. Specifications or tolerances are the numerical limits within which a system is designed to operate. Customers, engineers, or management set the tolerances and/or outline other specifications for a product or process. Quality control is needed to monitor the finished product or the various processes leading to the finished product. Usually quality control leads to various charts and/or arrays of data that describe the process in great detail.

Capability Analysis requires that the data be statistically stable. If the data is unstable Capability Analysis can be used to track past performance or to obtain a snapshot of what is currently happening with a process. Future performance can be extrapolated, but there is no guarantee past instabilities will continue to have the same effects. Capability Analysis can also be used to demonstrate the extent of improvements made to a process. In addition, Capability Analysis can expose to what extent improvements to a process need to be made.

Capability Analysis involves a method of manipulating a plurality of data values in order to generate a single representative number instead of the various charts or arrays of data typically used to describe a process. From this single number, manufacturers, suppliers, and customers know immediately the risk of defects associated with a process. If the process capability is greater than unity, this would lead a person to believe the process is performing within tolerances. The larger the process capability the better the process is performing. In other words, the tolerance range is larger than the process range.

If the process capability is less than unity, for example if it is 0.8, then the level of risk is 80%; or, 80% of the time the process will yield a result that is within the tolerance range. The question that arises is, "Is 80% tolerance for a process an acceptable risk?" From this question, another decision can be made, whether the tolerance range for the process having an 80% level or risk needs to be widened or are there improvements that need to/can be made to the process to improve the level of risk? For example, the manufacturer of a bolt can monitor bolt production, and from a Capability Analysis, know immediately if the bolts being manufactured are within tolerances, and what percentage of the bolts manufactured will be out of tolerance, or, if the process needs improvement.

The problem with the Capability Analysis process is that in order to generate reliable process capability numbers, raw data is needed. While raw data may not be difficult to obtain, it is complicated to obtain raw data that is in a usable and uniform format. The main problem arises because, data is collected in diverse ways by different companies. Companies trying to manage process capability in a global environment find the data they receive from manufacturers and/or suppliers to be based in a myriad of software packages and/or that the output data is of a format that is not compatible amongst different companies or even different departments within a single company.

The equations used for process capability are standard. Regardless of the user, the same results should be obtained in spite of the data reporting methods. Accordingly, there is a need for a tool that provides for the generation of a global process capability factor without requiring data providers to come up with a common data model or format (i.e. common delimited format) that can be uploaded into a database for the end user to perform there own calculations. There is a need for a tool that can normalize raw data from different data providers and thereby allow for the generation of a process capability without requiring the manipulation of raw data from a data provider.

SUMMARY OF THE INVENTION

The present invention provides a method and tool for generating representative data necessary to calculate a global process capability factor or an overall process capability factor. Representative data is generated from raw data that may have been collected in a variety of fashions. Some of the differences in the raw data may be a result of the software used to collect the raw data, the format in which the raw data is saved, and/or the number of data points collected.

In one aspect of the present invention either the capability factor and tolerance(s) for a process; or the mean, standard deviation, and tolerance(s) for a process are manipulated in order to generate a set number of data points (representative data set). This eliminates the need to have raw data sent from a manufacturer and/or supplier. Either a manufacturer and/or supplier will provide these statistics and process tolerance(s). The representative data generated will mimic the raw data and allow the user of the tool to store the generated representative data in a format that yields optimal utility for the user. When the generated representative data has been derived from the statistics and process tolerance(s) of a variety of manufacturers and/or suppliers, a global process capability factor may be created covering the variety of manufacturers and/or suppliers. Also, from generated representative data a manufacturer can calculate an overall process capability covering various manufacturing techniques and/or machines within their facility.

The term global process capability factor should not be limited to a plurality of raw data sets. If only one raw data set is collected then the process capability factor and the global process capability factor are equal and synonymous with one another. The terms process capability factor and process capability are synonymous. Process performance and process performance factor are synonymous. In addition, the terms process performance and process comparability and process capability factor are synonymous for situations where only one raw data set is available.

Embodiments may be implemented as a computer process, a computer system or as an article of manufacture such as a computer program product. The computer program product may be a computer storage medium readable by a computer system and encoding a computer program of instructions for executing a computer process. The computer program product may also be a propagated signal on a carrier readable by a computing system and encoding a computer program of instructions for executing a computer process.

BRIEF DESCRIPTION OF THE DRAWINGS

Non-limiting and non-exhaustive embodiments are described with reference to the following figures, wherein like reference numerals refer to like parts throughout the various views unless otherwise specified.

DETAILED DESCRIPTION OF THE INVENTION

Various embodiments are described more fully below with reference to the accompanying drawings, which form a part hereof, and which show specific exemplary embodiments for practicing the invention. However, embodiments may be implemented in many different forms and should not be construed as limited to the embodiments set forth herein; rather, these embodiments are provided so that this disclosure will be thorough and complete, and will fully convey the scope of the invention to those skilled in the art. Embodiments may be practiced as methods, systems or devices. Accordingly, embodiments may take the form of a hardware implementation, an entirely software implementation or an implementation combining software and hardware aspects. The following detailed description is, therefore, not to be taken in a limiting sense.

The logical operations of the various embodiments are implemented (a) as a sequence of computer implemented steps running on a computing system and/or (b) as interconnected machine modules within the computing system. The implementation is a matter of choice dependent on the performance requirements of the computing system implementing the embodiment. Accordingly, the logical operations making up the embodiments described herein are referred to alternatively as operations, steps or modules.

Figure 1:
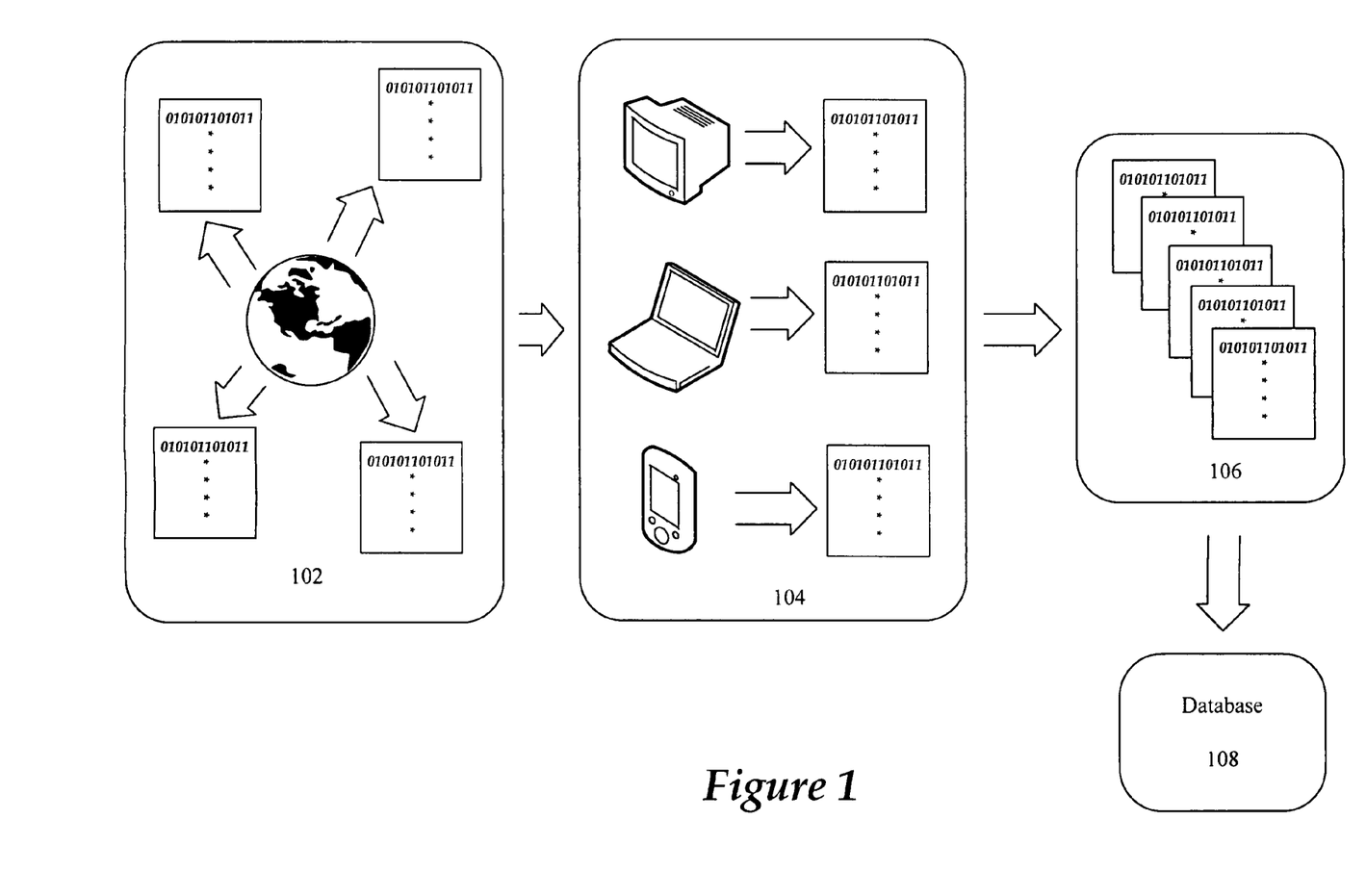
FIG. 1 depicts problems with lack of common data models and/or formats.
Figure 2:
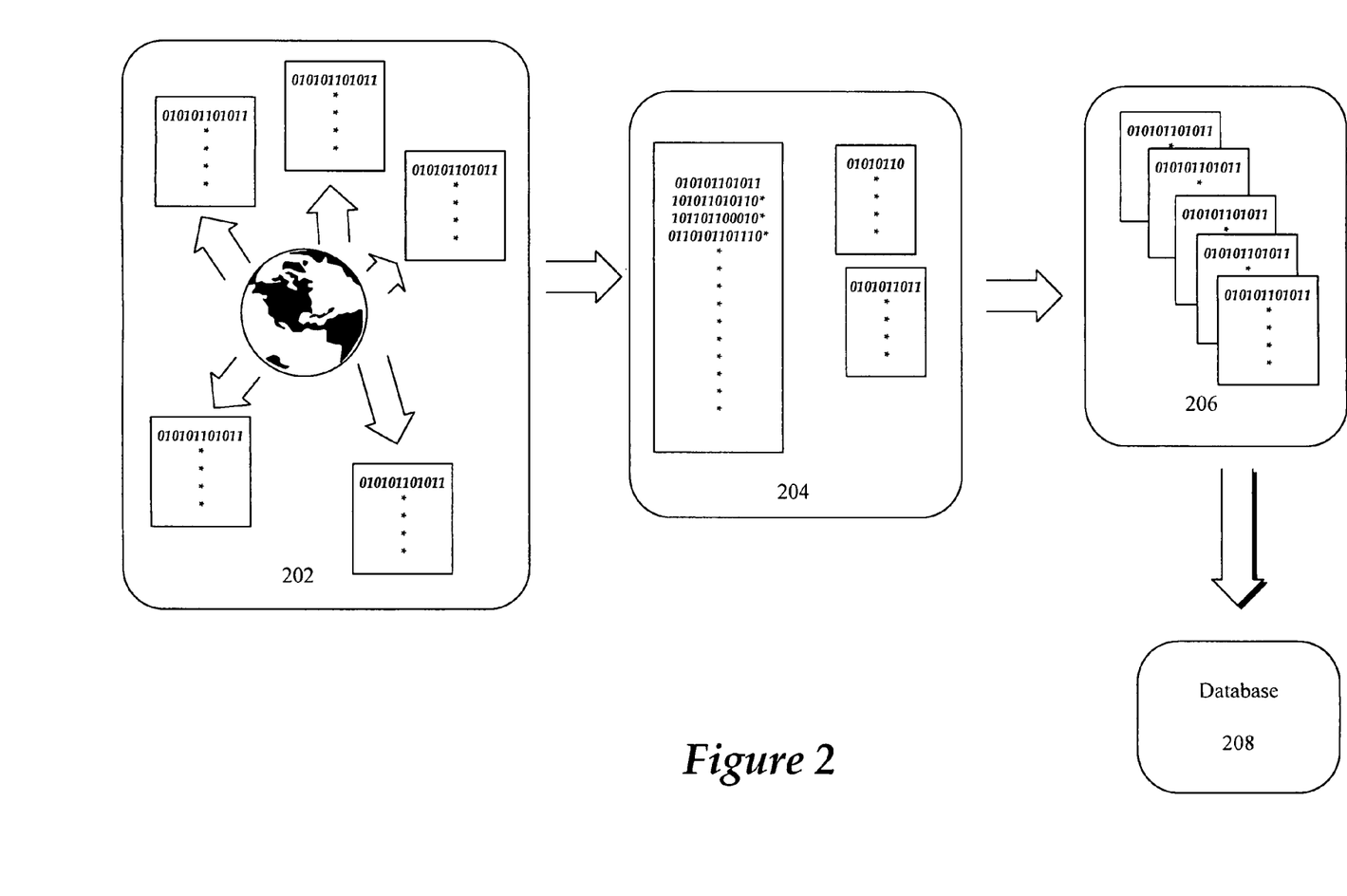
FIG. 2 depicts problems with raw data sets that lead to problems when trying to compare like processes.

Referring more particularly to the drawing, issues with generating a global process capability factor or an overall process capability are depicted in FIG. 1 and FIG. 2. FIG. 1 depicts a problem associated with lack of common data format. In the global environment with which companies must operate today, raw data sets can be collected from around the world 102. These raw data sets sometimes are collected with different equipment that could be implementing different software and saving the raw data in different output formats 104. For future computations involving the collected data, the data needs to be saved in exactly the same format 106. Once the raw data has been manipulated and saved in an acceptable format it can then be loaded into a database 108. Manipulating raw data from various manufacturers and/or suppliers is time consuming, labor intensive, and can lead to distortion of the data should a mistake be made.

FIG. 2 depicts a problem associated with trying to compare like processes. Raw data can be collected from around the world or from various machines within a plant 202. This raw data may be in different formats, contain unequal number of data points, or many other differences 204. These differences can arise from a variety of factors such as newer and/or different software used to collect raw data. In addition, newer and/or different machines used throughout the process resulting in data format discrepancies. For future computations the data needs to be saved in exactly the same format 206. Once the raw data has been saved in an acceptable format it can then be loaded into a database 208. Manipulating raw data from various processes, machines, manufacturers and/or suppliers is time consuming, labor intensive, and can lead to distortion of the data should a mistake be made.

Figure 3:
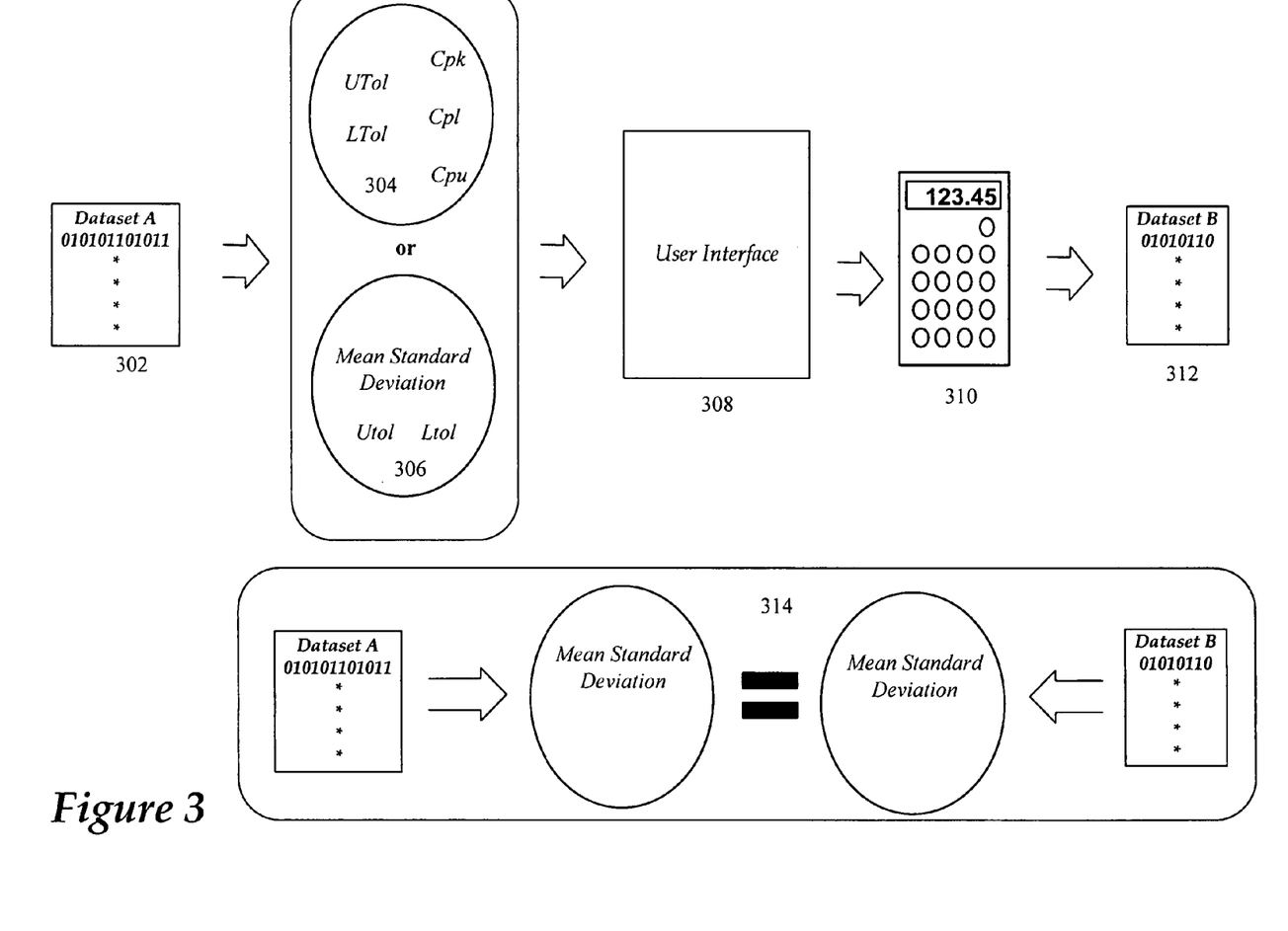
FIG. 3 depicts the process of generating data and saving generated data in a data bass.

All of the problems associated with raw data collected by various entities, using different software, collection techniques, formats, languages, etc. can all be overcome by generating a representative or mimicking data set that will mimic the raw data collected. FIG. 3 depicts the process of generating data from statistical information obtained from the raw data. Raw data along with process parameters are collected for a given process or set of processes 302. From this raw data the mean and standard deviation are determined using standard statistical methods and/or formulas generally known in the art. The process parameters are the tolerance(s) for the process. These tolerance(s) may be any set by an engineer or designer, or they may be natural limits set by the physical system. For example, an engineer may set the placement of the center of a drilled hole at 5 cm±0.01 cm from a reference datum. Another example might be measuring the thickness of a coating. There is a natural lower limit of zero, which is set by the physical nature of the problem in that a thickness cannot be negative. The present invention is a tool and method of processing the statistics and process parameters in order to generate a process capability from the representative data set that mimics the raw data collected. The input data needed to generate data that mimics a raw set of data values in one embodiment is the mean, standard deviation, and tolerance(s) 306. In an alternative embodiment, the input data needed to generate data that mimics a raw set of data is the process capability and the tolerance(s) 304. This process information 304, 306 is input to the tool via a graphical user interface, web interface, text interface, hard coding, or any number of input means 308. Within the tool, there are standard algorithms generally known in the art for generating a global process capability from mean, standard deviation, and tolerance(s) or from the process capability and the tolerance(s). Once the process information 304, 306 is input 308, the tool generates a predetermined number of representative or mimicking data points 310 according to statistical distributions such that the mean and standard deviation for both raw data 302 and generated representative data 312 are equal 314.

Most manufacturing processes yield data that have a Normal Distribution. For these instances the mimicking data point generator function of the tool will simply generate Standard Normal numbers via any acceptable algorithm including, but not limited to, Bernoulli Trials, rejection techniques, Central Limit Approximation, Box-Muller Algorithm, and/or Marsaglia-Bray Algorithm. Once the mimicking data points are generated, the data is translated and diluted so that the mean and standard deviation correspond to that of the mean and standard deviation of the raw set of data values.

For certain processes the raw data may not follow a Normal Distribution. Notwithstanding, the present invention still provides a method for the implementation of a Capability Analysis. Non-Normal data is generally the result of a process that naturally has a one sided specification, i.e. measuring paint thickness or flatness where the result can never be negative. In instances such as these, standard techniques such as Pearson curve fitting can be used to compare the raw data values to many theoretical distributions. If the skewness and/or kurtosis of the mimicking data points generated match the raw data's skewness and/or kurtosis then the tool implements a chi-squared test which will be satisfied.

Once the mimicking data points have been generated and any statistical checks to be performed have been completed, the mimicking data points generated are saved 312. During the process of saving the mimicking data points generated any process, manufacturer, and/or supplier identification data may be encoded to the data for later use. Once the mimicking data points generated are encoded with any additional process, manufacturer, and/or supplier identification data, the data is then sent to a database for later use. In this database the mimicking data points generated may be combined with other generated and/or raw data for later use.

To further illustrate the method and process of generating data from statistical information obtained from a set of raw data values performed by the present invention, shown in FIG. 3, consider the following example. A bolt manufacturer produces two million bolts per year. At the start of the year the manufacturer collects data from the first 200,000 bolts produced. This data could include any measurable parameter of the bolt including shaft diameter, overall length, deformation under a fixed load, etc. Assume that the only data collected is the bolt's shaft diameter and overall length; this means the manufacture has 400,000 data points to manipulate anytime an analysis needs to be performed.

Instead of storing and/or manipulating the raw data (400,000 data points), the raw data is analyzed once to determine its mean and standard deviation. The mean and standard deviation is input into the system tool along with the process tolerance(s) and processed in order to generate a predetermined number of ("n") mimicking data points. In this example, ("n") is 1,000. Accordingly, the tool will generate 1,000 mimicking data points per measured parameter. In this example the tool will generate 2,000 mimicking data points. These 2,000 generated data points mimic the 400,000 raw data points and will be easier and faster to retrieve and/or manipulate. Notwithstanding, this mimicking data accurately represents the 4000,000 raw data points.

Because the number of data points and/or format of the raw data collected may vary from one manufacturer and/or supplier to the next, this will cause complications in calculating a global process capability. First, if the number of data points for each manufacturer and/or supplier differs, then one manufacturer and/or supplier's data may overpower and negate the effects of another manufacturer and/or supplier. For instance, if manufacturer A collects 10,000 data points and manufacturer B only collects 500 data points, the 10,000 data points could cancel any effects the 500 data points may have on the global process capability.

Figure 4:
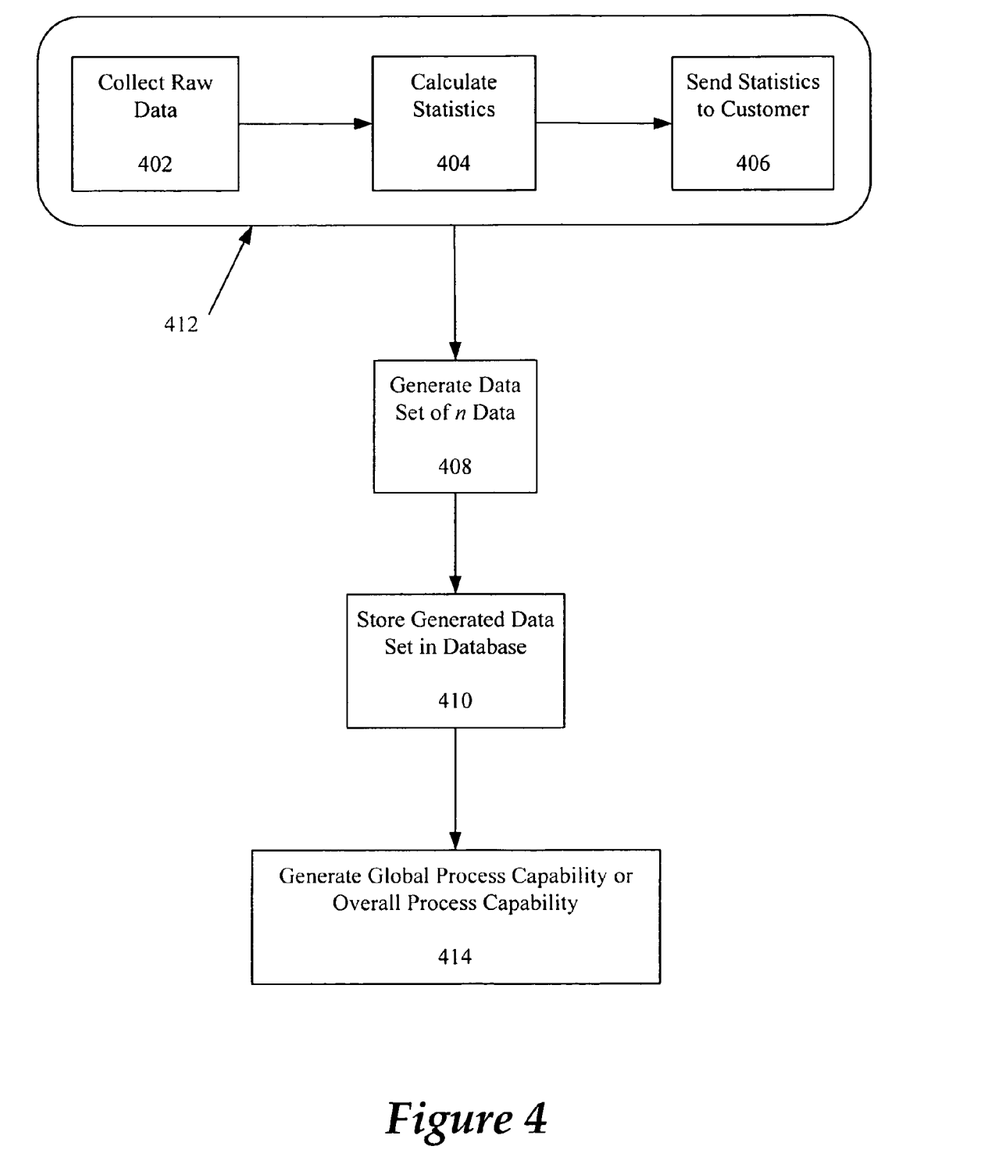
FIG. 4 depicts the steps for calculating a global process capability.

In some industries a customer has the ability to purchase a component, (i.e. a bolt) from various manufactures and/or suppliers from across the globe. FIG. 4 outlines the steps taken to determine a global process capability factor using the present invention. The process is best illustrated through the use of an example. Each of these global manufacturers and/or suppliers will collect raw data 402 for this bolt. This data could include any measurable parameter of the bolt including shaft diameter, overall length, deformation under a fixed load, etc. In this example, the only data collected is the bolt's shaft diameter and overall length.

From this raw data a manufacturer and/or supplier will determine the mean and standard deviation 404 for the raw data collected. It is contemplated that each manufacturer and/or supplier may determine the process capability 404 for their particular data set. Following the determination of the mean and standard deviation, the manufacturers and/or suppliers send these statistics along with the process parameters (tolerance(s)) to the customer 406. The collecting of raw data 402, calculation of statistics 404, and sending of statistics to customers 406 is a process conducted by individual manufacturers and/or suppliers as indicated by reference numeral 412. The customer collects this data from any number of manufacturers and/or suppliers as they wish.

Once the statistics and process parameter data is sent to the customer 406 by a manufacture and/or supplier, the customer can generate a predetermined number ("n") of data points 408 (i.e. 100 or 1,000) directly from the mean and standard deviation. If a manufacturer and/or supplier send the customer data representative of their particular process capability and process parameters, the customer will have to calculate the mean and standard deviation from these values. Once the mean and standard deviation are known, the customer may generate a predetermined number ("n") of data points 408. This generated representative data will be created in such a fashion that it will statistically mimic the raw data. In other words the generated representative data will have the same mean, standard deviation, skewness, and/or kurtosis of the raw data. This process of generating a predetermined number ("n") of data points is repeated for each manufactures' and/or suppliers' supplied statistical information, including the mean and standard deviation generated from the raw data in a first embodiment or the process capability and process parameters associated with the raw data in a second embodiment.

After the customer has generated a predetermined number of data points 408, the generated data can be further encoded with manufacturer and/or supplier identification information, or any other information the customer feels is necessary. Once any additional information that may be desired is encoded to supplement the generated data, the generated data can be stored in a database 410.

Once the customer has created generated representative data point sets for each manufacturer and/or supplier, a global process capability can be calculated 414. The global process capability is calculated by taking the generated representative data sets and concatenating them into one large data set. The mean and standard deviation of this large data set can be calculated using standard techniques. Once the mean and standard deviation are known the customer determines the tolerance(s) they want for a process. For instance the customer might set the bolt diameter at 5 cm±0.05 cm. Now with the mean and standard deviation from the large data set the global process capability can be calculated using standard techniques.

With the global process capability known the customer knows the associated risk from purchasing a product from any manufacturer and/or supplier in the world. If the associated risk is higher than a predetermined acceptable risk level either a particular supplier(s) with a low process capability and/or large standard deviation can be eliminated in a attempt to increase the global process capability.

Also, note that the suppliers of process capability and tolerance(s) and/or raw data mean, raw data standard deviation, and tolerance(s) are not necessarily competitors. They may be partners is an enterprise. The partners may or may not have access to the data generated by individual partners. Ideally, in a partnership the generated data would be stored in a database accessible to every partner.

The need for an equal number of data points is important to keep any particular manufacturer's and/or supplier's data from overpowering the analysis and leading to erroneous results. For example, if manufacturer A collects 500 data points and manufacturer B collects 10,000 data points an erroneous risk value could result. Assume manufacturer A has very low quality control measures therefore his data has a large standard deviation. Manufacturer B has high quality control standards therefore his data has a small standard deviation. If the raw data are concatenated into a large data set the 10,000 data points will overpower the 500 data points to the extent that the 500 data points could have not been included in the calculations and similar results would have been obtained. This would lead to a global process capability that grossly underestimates or overestimates the risk of buying from any arbitrary manufacturer and/or supplier.

Table 1 shows the importance of comparing data sets that contain an equal number of data points. Manufacturer A has a low process capability and 33% of the product produced is tolerant. Manufacturer B has a process capability greater than unity (1.66) and therefore 99.75% of product produced is not defective. When the raw data is concatenated the global process capability is greater than unity (1.13); which indicates that regardless of which manufacturer is chosen to obtain product from 99.75% of the product received will not be defective. If equal weight is give to each manufacturer using the present invention to generate two data sets of 100 points each, a true indication of the global process capability is indicated and the customer realizes that by arbitrarily choosing a manufacturer, 47% of the product received will be tolerant.

The global process capability can be used to reject a particular manufacturer and/or supplier. For example, if a predetermine risk of receiving defective product was 50% then arbitrarily choosing between manufacturers A and B is unacceptable due to the 47% risk factor associated with manufacturers A and B. Manufacturer A needs to be eliminated from the list of acceptable suppliers or some other improvements need to be made to lower the risk associated with arbitrarily choosing product from manufacturers A and B. However, if the predetermined risk was 40%, then arbitrarily choosing product between manufacturers A and B is acceptable with further changes.

TABLE 1

Process Capability Comparison

| | Number of Data Points | Mean (cm) | Standard Deviation (cm) | Tolerance (cm) | Process Capability |
|---|---|---|---|---|---|
| Manufacturer A | 500 | 5.0021 | 0.0503 | 0.05 | 0.3316 |
| Manufacturer B | 10000 | 5.0001 | 0.0100 | 0.05 | 1.6655 |
| Raw Data Combined | 10500 | 5.0002 | 0.0147 | 0.05 | 1.1350 |
| Generated Data | 200 | 5.0024 | 0.0353 | 0.05 | 0.4716 |

Figure 5:
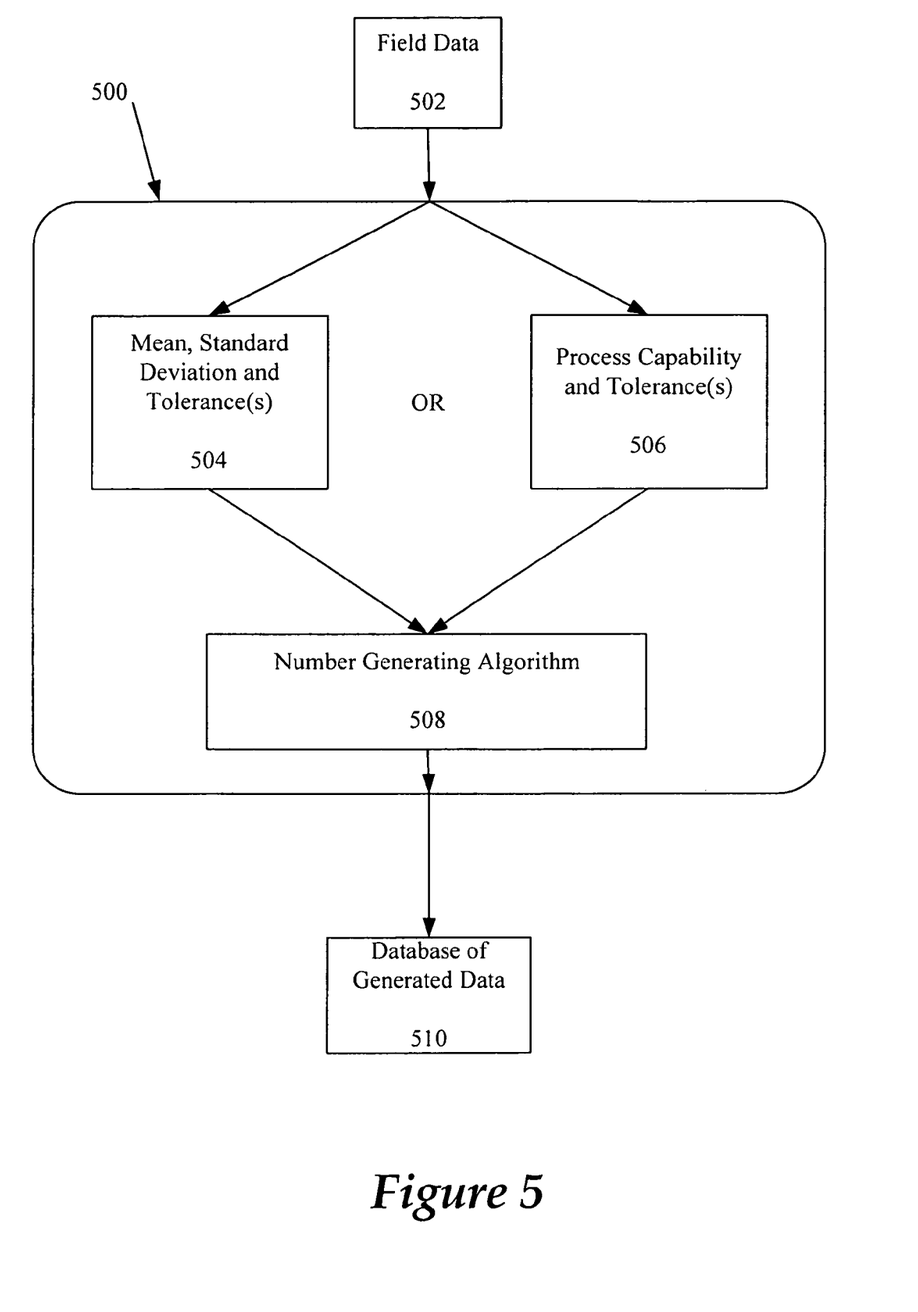
FIG. 5 depicts an apparatus for generating data for calculating either a global process capability or an overall process capability.

FIG. 5 depicts a tool for generating representative data that can be used for calculating either a global process capability or an overall process capability as indicated by reference numeral 500. Raw data 502 is analyzed using standard statistical techniques to determine the mean, standard deviation and/or process capability of a data set. The user has two options for input parameters. Either the mean and standard deviation along with process parameters (i.e. tolerance(s)) 504 must be input or the user may elect to input the process capability and the process parameters 506. If the process capability and the process parameters 506 are selected the mean and standard deviation are first calculated from these inputs. The mean and standard deviation are sent to a number generating algorithm 508 where numbers are sampled from an appropriate statistical distribution.

The number generating algorithm 508 can be further configured to accept inputs of skewness and/or kurtosis. These additional parameters can be used to better characterize the raw field data and/or generated representative data. In addition, for distributions that are non-normal chi-square testing can be performed to further determine if the generated data accurately mimics the raw field data. Once the generated representative data has been created and any significance testing performed the generated data may be encode with additional information such as manufacturer identification, abnormalities in a given production run, etc. After creation of the generated data the number generating algorithm 508 is further operatively configured to store the generated representative data in a database or some other storage medium 510.

Figure 6:
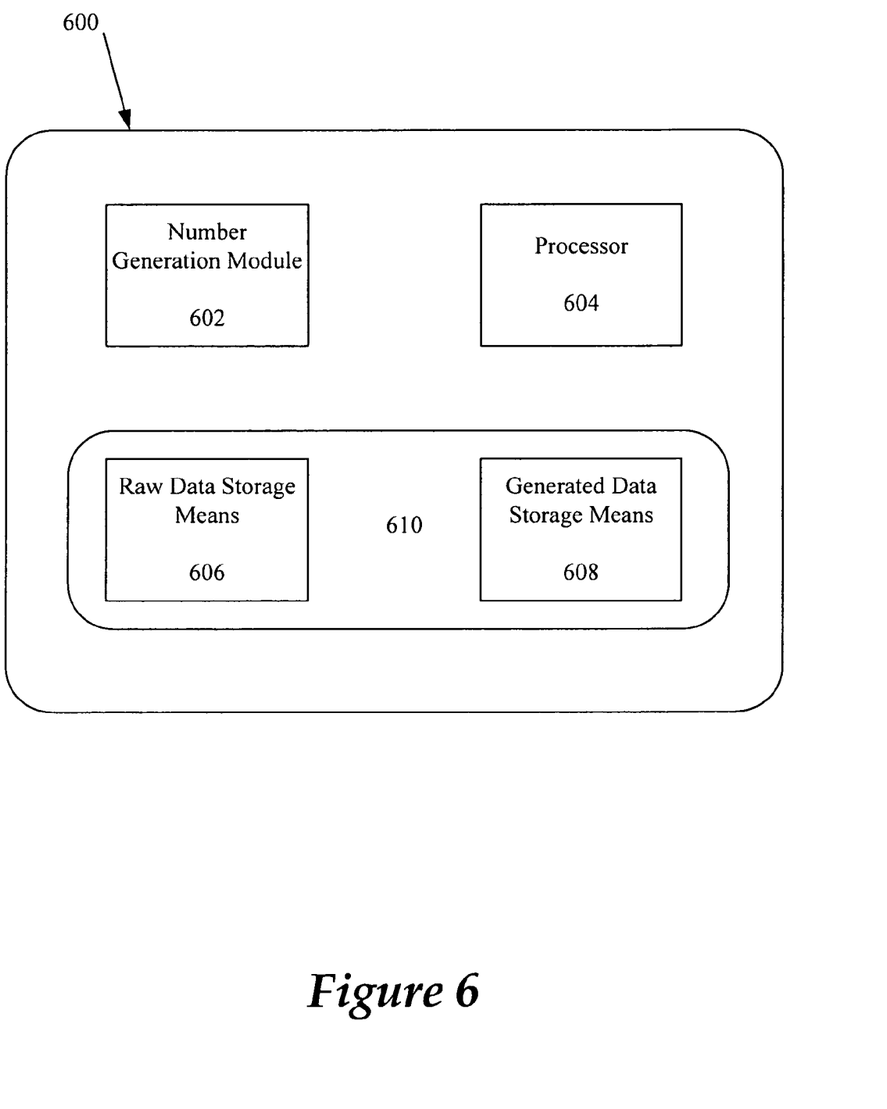
FIG. 6 depicts a computer system for implementing the present invention.

FIG. 6 depicts a computer system 600 necessary to implement the tool depicted in FIG. 5 and the method depicted in FIG. 4. The computer system 600 has processor 604 which controls the number generation module 602 and communicates with the raw data storage means 606 and generated representative data storage means 608. It is contemplated that the raw data storage means 606 and the generated representative data storage means 608 can be separate entities or combined into as single storage means as indicated by reference numeral 610. Acceptable storage means include, but not limited to, tape drive, standard computer hard drives, CD-ROM, DVD-ROM, etc. It is further contemplated that more elaborate computer systems can be implemented without departing from the scope and spirit of the invention.

The above specification, examples and data provide a complete description of the manufacture and use of the composition of the invention. Since many embodiments of the invention can be made without departing from the spirit and scope of the invention, the invention resides in the claims hereinafter appended.

We claim:

1. A computer-based method for generating a global process capability factor for a process, said method using at least one processing device and comprising the steps of:

a. calculating, with the at least one processing device, statistics for multiple sets of raw data numbers associated with the process, each set having at least "m" raw data numbers;

b. generating with the at least one processing device, using a number generating algorithm and the calculated statistics, at least one dataset of "n" data points that are representative of a corresponding at least one set of at least "m" raw data numbers, the "n" data points having a mean equal to the mean of the corresponding set of raw data numbers and a standard deviation equal to the standard deviation of the corresponding set of "m" raw data numbers, where "n" is a predetermined number that is less than "m", and where "m" may vary for each set of raw data numbers, the "n" data points having a user selected distribution;

c. determining a process capability factor for the process with the at least one processing device using a plurality of concatenated sets the at least one set of "n" data points;

d. applying the process capability factor to a plurality of suppliers associated with the process; and e. determining, based on the application of the process capability factor, which suppliers have an acceptable risk factor for supplying a product and which suppliers should be eliminated from a list of accepted suppliers for the product.

2. The method of claim 1, wherein said calculated statistics comprise data representative of a raw data sample mean, a raw data sample standard deviation, and tolerance(s) for the process.

3. The method of claim 1, wherein said calculated statistics comprise data representative of a process performance factor for the process and tolerance(s) for the process.

4. The method of claim 1, wherein the user selected distribution comprises one of:
   a. a standard normal statistical distribution;
   b. a skewed left normal statistical distribution; and
   c. a skewed right normal statistical distribution.

5. The method of claim 1, wherein the generated at least one set of "n" data points for each of said at least one set of "m" raw data numbers contains an equal number of data points.

6. The method of claim 5, wherein the generated data points for each of said raw data sets contains an equal number of no less than one hundred data points.

7. The method of claim 1, further comprising the step of adding data provider identification data to the generated data points.

8. The method of claim 1, further comprising the step of storing the at least one set of generated data points in said central database.

9. The method of claim 1 wherein the process capability factor generated is global as it is representative of a plurality of sets of raw data numbers associated with the process.

10. A computer-based method for evaluating a risk factor of receiving defective product from at least two suppliers using a global process capability factor utilizing at least one processing device and comprising the steps of:
   a. determining an acceptable risk factor;
   b. generating, with the at least one processing device using a number generating algorithm, based on first statistics for a first set of "m" raw data numbers provided by a first supplier, a first set of "n" data points that that are representative of the first set of "m" raw data numbers, the "n" data points having a mean equal to the mean of the "m" raw data numbers and a standard deviation equal to the standard deviation of the "m" raw data numbers, where "n" is a predetermined number that is less than "m";
   c. generating, with the at least one processing device using a number generating algorithm, based on second statistics for a second set of "k" raw data numbers provided by a second supplier, a second set of "n" data points that that are representative of the second set of "k" raw data numbers, the "n" data points having a mean equal to the mean of the "k" raw data numbers and a standard deviation equal to the standard deviation of the "k" raw data numbers, where "n" is a predetermined number that is less than "k";
   d. determining a global process capability factor for the process with the at least one processing device using a concatenation of the first set and the second set of representative data points;
   e. comparing said global process capability factor to said acceptable risk factor; and
   f. rejecting product from at least one supplier if said global process capability factor is greater than said acceptable risk factor.

11. The method of claim 10, wherein said first statistics and said second statistics comprise data representative of a raw data sample mean, a raw data sample standard deviation, and tolerance(s) for the process.

12. The method of claim 10, wherein said first statistics and said second statistics comprise data representative of a process performance factor for the process and tolerance(s) for the process.

13. The method of claim 10, further comprising the step of adding provider identification data to the first and second sets of representative data points.

14. The method of claim 10, further comprising the step of storing said at least one generated number data set in a central database.

15. A method of information sharing between partners using a global process capability factor common to a partnership for a process comprising the steps of:
   a. calculating statistics for at least two sets of raw data numbers with a processing device, the sets of raw data numbers provided by the partners associated with the process, the sets being unequal in size;
   b. generating, with the processing device and a number generating algorithm, using the calculated statistics, sets of "n" data points that are representative of and correspond to the at least two sets of raw data, the respective "n" data points point sets having a mean equal to the mean of the corresponding raw data set and a standard deviation equal to the standard deviation of the corresponding raw data set, where "n" is a predetermined number that is less than the number of raw data numbers in each set, and where the number of raw data numbers are different for each set;
   c. storing said sets of "n" data points in a database, the database in communication with the processing device and accessible by the partnership;
   d. determining, using a concatenation of the sets of "n" data points, a global process capability factor common to the partnership for the process; and
   e. using the global process capability factor to determine if a risk of receiving defective product from the partners participating in the process is within an acceptable range.

16. The method of claim 15, wherein said calculated statistics comprise data representative of a raw data sample mean, a raw data sample standard deviation, and tolerance(s) for the process.

17. The method of claim 15, wherein said calculated statistics comprise data representative of a process performance factor for the process and tolerance(s) for the process.

18. The method of claim 15, further comprising the step of adding provider identification data to the sets of generated data points.

* * * * *